United States Patent [19]

Duda

[11] 4,288,923
[45] Sep. 15, 1981

[54] TAPE MEASURE

[75] Inventor: Werner Duda, West Sayville, N.Y.

[73] Assignee: Roe International, Inc., Patchogue, N.Y.

[21] Appl. No.: 105,296

[22] Filed: Dec. 19, 1979

[51] Int. Cl.³ .............................................. G01B 3/08
[52] U.S. Cl. ..................................................... 33/138
[58] Field of Search ............ 33/138, 139, 140, DIG. 6; 242/84.8, 107.3; 308/26, 237 A

[56] References Cited

U.S. PATENT DOCUMENTS

| | | | |
|---|---|---|---|
| 1,211,480 | 1/1917 | Newton | 33/DIG. 6 |
| 1,555,150 | 9/1925 | Oswald | 274/39 A |
| 2,577,051 | 12/1951 | Voegtlin | 274/1 L |
| 3,164,907 | 1/1965 | Quenot | 33/138 |
| 3,499,407 | 3/1970 | Reimer | 308/26 |
| 3,510,137 | 5/1970 | Freier | 274/39 A |
| 3,519,220 | 7/1970 | Zelnick | 242/107.2 |
| 3,820,848 | 6/1974 | Kniff | 308/26 X |
| 4,057,304 | 11/1977 | Gaines et al. | 308/237 A |
| 4,128,355 | 12/1978 | Leaf | 308/26 X |
| 4,153,996 | 5/1979 | Rutty | 33/138 |

Primary Examiner—Harry N. Haroian
Attorney, Agent, or Firm—Curtis, Morris & Safford

[57] ABSTRACT

A tape measure includes a housing having an opening and a measuring tape coiled therein including a free end having a hook member attached thereto. The free end of the tape extends through the opening in the housing and a braking lever is pivotally mounted to the housing with its front end adjacent the opening in position to engage the hook member when the tape is in a retracted position. The front end of the lever is normally biased into engagement with the tape, at the housing opening, by a spring, thereby to prevent movement of the tape. A pivot member for absorbing the shock of impact when the hook member engages the front end of the lever during retraction of the tape includes a pivot pin for pivotally mounting the lever to the housing and a shock absorbing element of a deformable, resilient material adjacent the pivot pin for absorbing the shock.

9 Claims, 7 Drawing Figures

FIG. 1
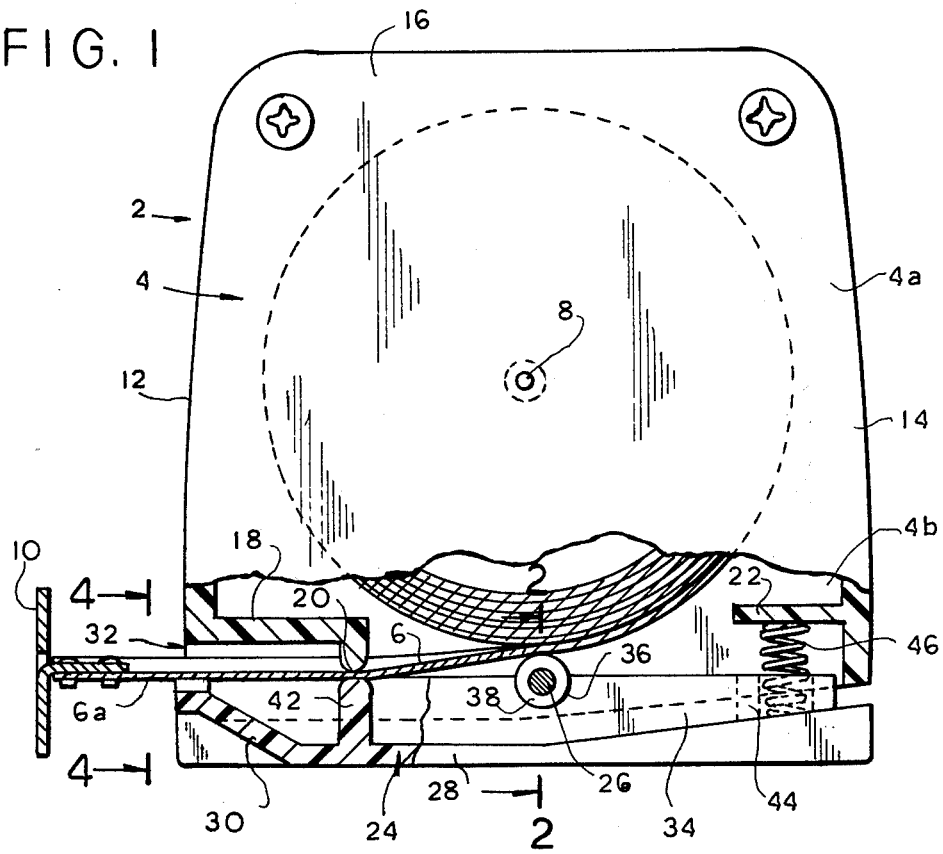
FIG. 2
FIG. 3
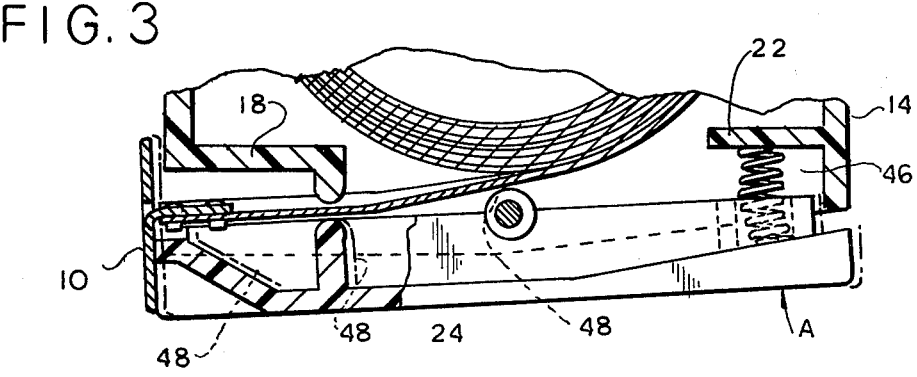

TAPE MEASURE

BACKGROUND OF THE INVENTION

This invention relates to tape measures, and more particularly, to a coiled measuring tape adapted to be locked in an extended or unwound position.

Length-measuring instruments including coiled tapes, made of steel or like material, are well-known. In such devices, the measuring tape is coiled about a spool in a housing by means of a recoil spring and the drawing of the tape from the housing acts against the action of the recoil spring. Such devices are shown, for example, in U.S. Pat. Nos. 3,318,550; 3,521,831; and 3,905,114.

In such devices, there is often provided a braking member which is adapted to retain the tape in an extended position when unwound to a desired measuring length. The utilization of a braking member eliminates the need for the user to grasp the tape to prevent it from being rewound by the recoil spring entirely into its casing. Although various types of braking devices have been proposed, one such device, to which the present invention is directed, includes a braking lever which is pivotally attached to the housing and has an end which is normally biased to engage the tape extending out of the housing opening, for example, as shown in U.S. Pat. Nos. 3,220,112 and 3,610,548.

Typically, in coilable rule tape measures, the free end of the coiled tape includes a hook portion which engages the housing when the tape is in its fully retracted position. In this manner, the tape is prevented from totally recoiling within the housing and the hook portion can be grasped during successive uses for unwinding the tape. However, the coil spring used to rewind the tape into the housing is very strong and imparts a tremendous shock to the hook portion when the tape is rewound in the housing, that is, when the hook portion hits against the housing. This shock tends to break the hook portion from the free end of the tape, resulting in the tape totally recoiling within the housing. Accordingly, shock absorbing members have been provided which absorb the shock when the hook portion hits against the housing. Such devices take various forms, such as a spring-loaded member, shown in U.S. Pat. No. 3,519,220, and a resilient stop extending from the housing against which the hook portion hits, shown in U.S. Pat. No. 3,578,259.

Another shock absorbing tape rule device, which provides a combination of both braking and shock absorbing, is shown in U.S. Pat. No. 4,153,996. That device includes a braking lever pivotally mounted to the housing by a pivot pin disposed in an elongated slot. The braking lever has a front end disposed adjacent the housing opening for engaging the tape. A coil spring at the other end of the braking lever biases that end away from the housing and braking lever so as to exert a vertical biasing force, which biases the front end about the pivot pin and towards the tape, and a longitudinal or horizontal biasing force, which biases the pivot pin towards the front end of the elongated slot. Thus, when the hook portion at the end of the tape hits against the front end of the lever, much of the impact is absorbed by the coil spring causing the pivot pin to travel towards the rear of the elongated slot until the coil spring recovers to return the pivot pin back to its original position. However, this device has certain disadvantages. For example, because the coil spring is not acting totally in the vertical direction, a lesser force is exerted in this direction, necessitating a larger coil spring. Further, because of the tremendous impact of the hook portion against the lever, there can be wear on the coil spring, eventually resulting in degradation of the coil spring and, consequently, of the braking action of the lever.

OBJECTS AND SUMMARY OF THE INVENTION

Accordingly, it is an object of this invention to provide a coilable measuring rule that avoids the abovedescribed difficulties encountered with the prior art.

Another object of this invention is to provide a coilable measuring rule including a mechanism which is adapted to lock the tape in a desired extended position and to absorb shock from the tape during retraction.

A further object of this invention is to provide a pivot pin for pivotally mounting a braking lever to the housing for locking the tape in a desired extended position in which a shock absorbing element of a deformable, resilient material is associated with the pivot pin for absorbing shock from the hook member during the return of the tape to its retracted position.

A still further object of this invention is to provide a coilable measuring rule which is simple in construction and operation.

In accordance with an aspect of this invention, a coilable measuring rule includes a housing having an opening and a measuring tape coiled within the housing including a free end with a hook member thereat extending through the opening in the housing. A braking lever is pivotally mounted to the housing and has a front end portion adapted to engage the hook member when the measuring tape is in its retracted position. A spring normally biases the end of the lever into engagement with the tape to prevent retraction when the tape is in an extended position. There is further provided means for absorbing the shock of impact when the hook member engages the front end portion of the lever during the return of the tape to its retracted position. This shock absorbing means includes a pivot pin for pivotally mounting the lever on the housing and a shock absorbing member of a deformable, resilient material associated with the pivot pin for absorbing the shock.

The above, and other, objects, features and advantages of the invention, will be apparent in the following detailed description of illustrative embodiments of the invention which is to be read in connection with the accompanying drawings.

BRIEF DESCRIPTION OF THE DRAWINGS

FIG. 1 is a side plan, partially cut-away view of one embodiment of a coilable rule according to this invention;

FIG. 2 is a cross-sectional view, taken along line 2—2 of FIG. 1 illustrating the arrangement of the pivot pin in the embodiment of FIG. 1;

FIG. 3 is a cross-sectional view of the cut-away portion of the coilable rule of FIG. 1, illustrating the operation of the braking lever and pivot pin;

DETAILED DESCRIPTION OF THE PREFERRED EMBODIMENTS

Figure 5:
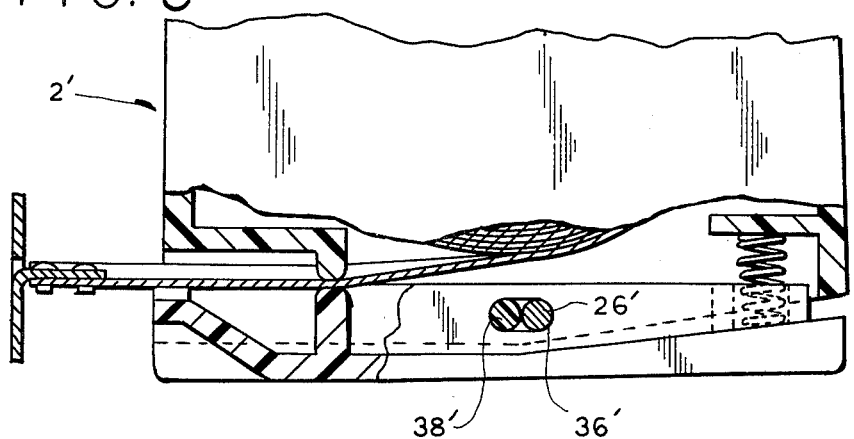
FIG. 5 is a side plan, partially cut-away view of the lower portion of a second embodiment of the coilable rule according to this invention.
Figure 4:
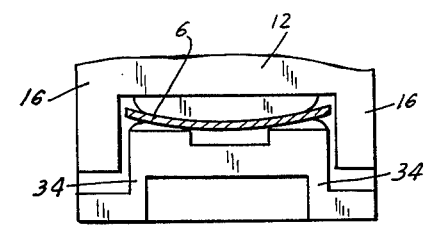
FIG. 4 is a front plan view of the coilable rule of FIG. 1, taken along line 4—4 thereof.

Referring to the drawings in detail, and initially to FIG. 1 thereof, the coilable rule 2 includes a housing or casing 4 which is formed of a pair of mating sections 4a and 4b, in the conventional manner, which, when assembled together, define a hollow interior. A spool (not shown) is rotatably supported within the interior of housing 4 by a pivot pin or hub 8, and a measuring tape 6 is coiled or wrapped around the spool. Although not shown, a conventional recoil spring is provided for normally rotating the spool in the counter-clockwise direction of FIG. 1 to retract measuring tape 6 completely within housing 4. The free end 6a of measuring tape 6 extends from housing 4 and a hook 10 is secured to free end 6a. Hook 10 provides a finger hold which permits measuring tape 6 to be manually drawn, unwound, and extended from housing 4 to a desired position. It also prevents measuring tape 6 from totally recoiling about the spool.

Housing 4 has a front wall 12, rear wall 14, side walls 16 and is open along its bottom end. A first inwardly turned integral flange 18 extends from front wall 12 and includes a downwardly directed projection 20. A second inwardly turned flange 22 extends from rear wall 14.

As shown in FIG. 1, a braking lever 24 is pivotally secured to the lower end of housing 4 by a pivot pin 26, and extends across the open bottom end of housing 4 from front wall 12 to rear wall 14. It is thus seen that braking lever 24 effectively closes the bottom opening of housing 4. As shown in FIG. 1, braking lever 24 includes a lower base section 28 which is upwardly inclined at its front end 30 and which defines a housing opening 32 between front end 30 and flange 18. A pair of upstanding walls 34 are situated on and extend along, but inwardly of, the opposite longitudinal sides of base section 28. These walls include transversely aligned slots 36 which extend about a generally circular arc greater than 180°. A pair of bushings or grommets 38 of a hollow, cylindrical configuration are press-fit within slots 34 and pivot pin or shaft 26 extends through the hollow portions of grommets 38 into corresponding generally complementary apertures 40 in side walls 16 where they are rotatably received. In this manner, braking lever 24 is pivotally connected to housing 4 by means of pivot pin 26.

Braking lever 24 includes an upstanding projection 42 near its front end 30 which is aligned with projection 20 of housing 4 to be urged against the projection when braking lever 24 is rotated about pivot pin 26 in the clockwise direction of FIG. 1. Also, an upstanding hollow, cylindrical projection 44 is provided at the rear end of braking lever 24. A coil spring 46 is disposed within hollow projection 44 and engages the rear portion of braking lever 24 and flange 22 of housing 4. In this manner, coil spring 46 normally biases lever 24 in the clockwise direction of FIG. 1 to lockingly engage measuring tape 6 between projections 20 and 42 to prevent movement thereof, as shown in FIG. 1. However, as shown in FIG. 3, when braking lever is urged against the force of coil spring 46 in the direction of arrow A, tape 6 is freed for movement and returned to housing 4 by the recoil spring.

Because of the relatively large force exerted by the recoil spring in returning tape 6 to housing 4, when tape 6 is returned to its retracted position shown in FIG. 3, hook member 10 hits against braking lever 24 and a substantial shock is imparted thereto. This shock can result in the breaking off of hook member 10 from measuring tape 6. In such event, tape 6 could then totally recoil within housing 4.

The present invention avoids this problem by the provision of grommets 38 which are made from a deformable and resilient material, such as rubber. Thus, as shown in FIG. 3, at the termination of the recoil of tape 6, hook member 10 engages the front end 30 of braking lever 24, causing braking lever 24 to be shifted slightly rearward due to the deformation of grommets 38, as shown by dotted line 48. Once the force of the shock has passed, resilient grommets 38 return to their original configuration. Thus, undue stress and wear on hook member 10, braking lever 24 and housing 4 are substantially eliminated. It is further seen that, in utilizing this arrangement, there is no substantial stress and wear on coil spring 46 from the impact. By this arrangement the pivot pin 26 remains stationary in the housing, with the lever 24 being resiliently mounted on the pin. This avoids wear on both the pin and housing.

Figure 6:
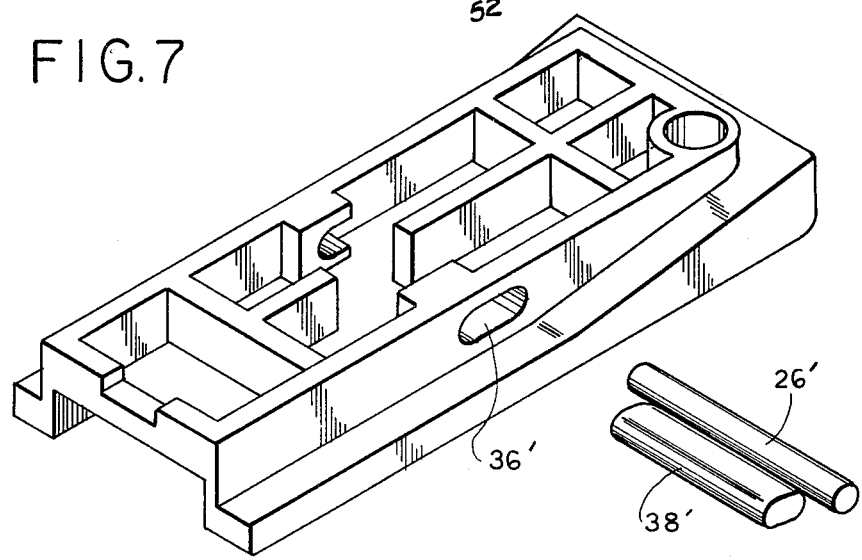
FIG. 6 is a perspective view of the braking lever and pivot pin according to the embodiment of FIG. 5.

A second embodiment of the present invention is shown in FIGS. 5 and 6 wherein a coilable rule 2' similar to that described with reference to FIG. 1 has a brake lever 24 in which elongated apertures 36' are provided in lieu of slots 36. The lever is mounted on the housing 4 by a pivot pin 26 whose ends are rotatably received in recesses 40, as in the prior embodiment. A shock absorbing bar or strip 38' is positioned in front of pivot pin 26' with its ends in apertures 36'.

The shock absorbing strip 38' is made of a deformable, resilient material, such as a rubber. It is to be noted that shock absorbing strip 38' does not extend along the entire longitudinal length of pivot pin 26', and the ends of pivot pin 26' are received within corresponding apertures in side wills 16 of the casing. This arrangement operates in a substantially identical manner to the embodiment of FIG. 1. Thus at the termination of recoil, when hook member 10 engages the front end 30 of braking lever 24, lever 24 is shifted rearwardly and the shock of impact is absorbed by shock absorbing bar 38'.

Figure 7:
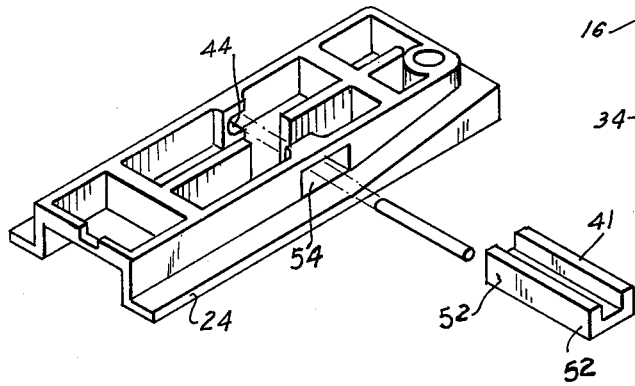
FIG. 7 is a perspective view, similar to FIG. 6 of another embodiment of the invention.

In another embodiment, shown in FIG. 7, a channel shaped shock absorbing element 41 is provided whose ends 52 are received in rectangular aperture 54 in lever 24. The recess 54 of channel 40 receives the pivot 26 whose ends are pivotally mounted in recesses 40 of the rule casing. The resilient channel serves to absorb tape impact shocks in the same manner as the bar 38' previously described.

It is thus readily apparent that the present invention provides a simple, but novel, arrangement for locking tape 6 at a desired extended position while also absorbing the shock imparted by hook member 10 at the termination of recoil.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:
1. A tape measure comprising:

a housing having an opening defined therein; an extensible measuring tape coiled within said housing including a free end extending through said opening and adapted to move between retracted and extended positions; a hook member mounted on said free end of the tape; a braking lever pivotally mounted on said housing and having a first end portion including a free end positioned to engage said hook member when said measuring tape is in its retracted position; spring means extending perpendicularly to said lever for normally biasing said first end portion of said lever into engagement with said tape to prevent movement thereof; and separate means for absorbing the shock of impact when said hook member engages the free end of said lever during the return of said tape to said retracted position, including a pivot pin mounted in said lever for pivotally mounting said lever on said housing and permitting longitudinal movement of the lever in the direction of tape retraction perpendicularly to said spring means and relative to the pivot pin, said lever having enlarged openings formed therein of substantially larger dimension in the direction of tape retraction than the diameter of said pivot pin on which said lever is pivotally mounted, and said housing having a pair of opposed openings formed therein facing said brake lever and having a diameter substantially equal to the diameter of said pivot pin; said pivot pin having free ends pivotally mounted in said housing openings and held thereby against lateral movement, whereby said lever is pivotally mounted by said pivot pin on said housing, and a shock absorbing member of a deformable, resilient material located in said enlarged opening of said lever and engaged between said pivot pin and said lever for absorbing shock caused by the longitudinal movement of the lever relative to the fixed pivot pin upon said impact.

2. A tape measure according to claim 1; in which said shock absorbing member includes at least one resilient grommet mounted in said lever and surrounding said pivot pin.

3. A tape measure according to claim 2; in which said enlarged opening in said braking lever comprises transversely aligned slots formed therein for receiving said at least one grommet in a press-fitting manner thereby to pivotally mount said lever on said pivot pin.

4. A tape measure according to claim 2; in which said at least one grommet is made from a rubber material.

5. A tape measure according to claim 1; in which said housing has an open side edge and said braking lever is located to extend longitudinally across the open side of the housing; said spring means including a coil spring mounted to extend perpendicularly to said lever on the side of said pivot pin opposite said first end portion of the lever to urge the first end portion of the lever into braking engagement with the tape.

6. A tape measure according to claim 1; in which the enlarged opening in said braking lever comprises at least one elongated aperture formed therein and in which said pivot pin and said shock absorbing member are situated.

7. A tape measure according to claim 6, in which said shock absorbing member is an elongated strip of material mounted in said aperture in the lever in front of said pivot pin in the direction of tape retraction.

8. A tape measure according to claim 6; in which said shock absorbing member is a channel shaped element mounted in said elongated lever aperture and having an elongated recess formed therein receiving said pivot pin.

9. A tape measure according to either of claims 7 or 8; in which said shock absorbing member is made from a rubber material.

* * * * *